Aug. 24, 1965 C. F. CARLSON 3,202,071

MASK

Filed Oct. 25, 1962 3 Sheets-Sheet 1

INVENTOR.
CHESLEY F. CARLSON
BY
H. J. Woodward
Atty.

Aug. 24, 1965 C. F. CARLSON 3,202,071

MASK

Filed Oct. 25, 1962

3 Sheets-Sheet 2

INVENTOR.
CHESLEY F. CARLSON
BY
H. J. Woodward
Atty

INVENTOR.
CHESLEY F. CARLSON
BY
H. F. Woodward
atty

United States Patent Office 3,202,071

Patented Aug. 24, 1965

3,202,071

MASK

Chesley F. Carlson, 5225 Minnehaha Blvd., Minneapolis, Minn.

Filed Oct. 25, 1962, Ser. No. 233,040

3 Claims. (Cl. 95—79)

This invention relates to a mask used in the graphic arts generally referred to as "masking material" and more particularly to a mask used in the stripping and platemaking operation.

An object of the invention is to provide an improved mask that is provided with quickly removable window.

A further object is to provide an improved mask and a method of using that provides superior results in more economical manner.

A further object is to provide a layout grid for purposes of registration of film in relation to holes punched around the perimeter of the grid.

A further object is to provide a mask with holes punched around the perimeter of a die-cut, quickly removed window and a printed layout grid so as to enable film normally used to extend beyond holes when film is placed in proper position under mask.

A further object is to provide a mask with a die-cut window held in place in the mask by small, uncut portions in die-cutting with this quickly removable window in relation to holes punched around the perimeter of the die-cut area.

A further object is to provide a mask with holes punched around the perimeter of printed grid and die-cut easily removable window and with suitable pressure sensitive tape positioned over these holes in manufacture as to provide means of securing mask and film together in minimum of time and without need for conventional taping method of removing tape from roll and positioning over mask.

A further object is to provide mask with die-cut, quickly removable window and printed layout grid in relation to two holes punched at proper dimension and position into end of mask, these holes to facilitate positioning of mask to offset plate or film so image on negative is positioned properly on plate in minimum time.

Other and further objects of the invention will be set forth in detail in the specification appended hereto and explained in conjunction with the drawings wherein FIGURE 1 is a top plan view of the improved masking material;

In the graphic arts there is required a material that generally is known as a "masking material." This material may be paper, plastic (such as colored or clear vinyl) or other similar material. The function of the masking material is to be the base or vehicle to which negatives or positives are secured (as by taping) or otherwise attached in what is known as the "stripping operation."

Heretofore there has been used masking paper or plastic with a definitely defined procedure. This procedure is to draw the outline of an area (for example a page or printed area) on the mask. Within this area and properly positioned, secure the negative or negatives. The negative having been taped or otherwise secured to the masking material, the masking material is then cut away with a sharp tool (for example a razor blade) to open only that portion of the mask through which light is to pass and through the negative attached to the mask. The positioning and taping of the negatives involve an awkward and time consuming procedure in the positioning of the negatives under the mask and the taping or securing thereto. The cutting away of the desired portions of the masking material is slow and tedious as the opening must be very closely aligned to the image.

In certain fields, a large percentage of the work involves standard sizes of pages and images (for examples 8½ x 11, 8½ x 7 and 8½ x 5½). These images are exposed to standard size films such as 8 x 10 and 10 x 12 inch.

Figure 1:
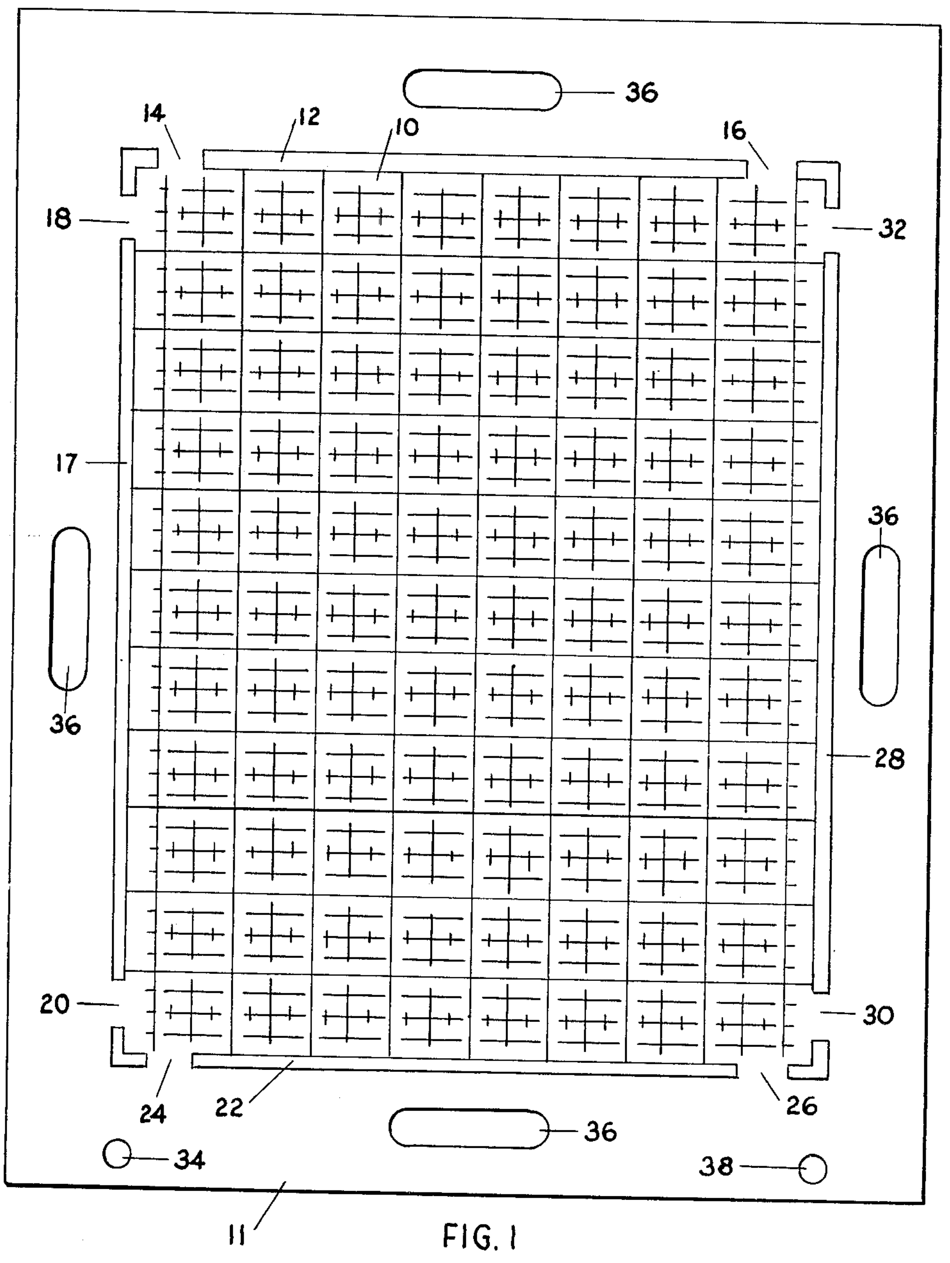
Figure 2:
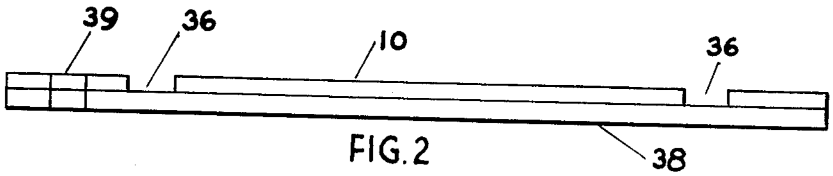
FIGURE 2 is a side view of the mask and film in proper register.
Figure 4:
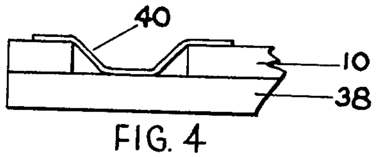
FIGURE 4 is a view similar to FIGURE 3 with the film and mask taped together.
Figure 3:
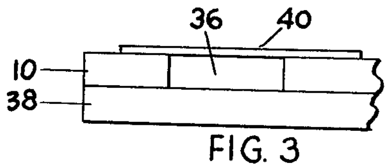
FIGURE 3 is a sectional view with parts broken away of the mask and film with the tape over the taping openings.
Figure 5:
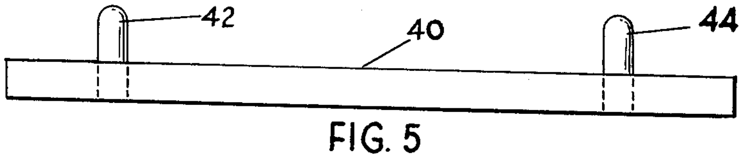
FIGURE 5 is a side view of frame having pins or nibs thereon.

To improve and facilitate the normal procedure of stripping, taping and removal of desired portions of the mask, the masking material shown in the drawing may be employed. A standard making material 11 (paper, plastic or the like) has die-cut slits or openings 12, 17, 22 and 28 cut around the image area. The areas 14, 16, 18, 20, 24, 26, and 32 hold the image area intact with the mask 11. The pattern 10 is designed to establish a grid or layout device by which it easier to locate and fasten the image in relation to the outline. It is to be understood that the pattern 10 may have a wide variety of designs. A printing plate is prepunched with predetermined spaced apart holes. The prepunching of the printing plate is usually by the manufacturer but it could be done by the operator. The mask 11 is punched with holes 34 and 38 correspondingly spaced holes to register with the plate by means of pins or nibs 42 and 44 on frame 40, it being understood that the thin bar and pin may be replaced by individual pins. Openings 36 are positioned around the edges of the mask 11. The holes may be of various shapes but it is preferred that they be elongated as shown in FIGURE 1.

The holes 36 are so positioned that they will fall within the dimensions of a standard film 38 (8 x 10 and 10 x 12) but outside of the image area.

In operation the negative 38 is placed on the mask and then the mask 11 is registered therewith by means of grid 10. A suitable pressure sensitive tape 40 has been secured to the mask over the openings 36. The tape is then forced downwardly to securely fasten the negative to mask 11. The mask is now grasped and lifted from the image area with one simple motion. This presents a clean, well defined area exposing only the portion of the negative through which light is to pass. This results in a large saving in time in stripping and removing the mask for exposure.

It is to be understood that the securing means such as pressure sensitive tape or the like may be placed over the holes after the mask is registered with the film, etc. If the tape is already affixed to the mask over the holes 36, greater speed in taping results.

Figure 6:
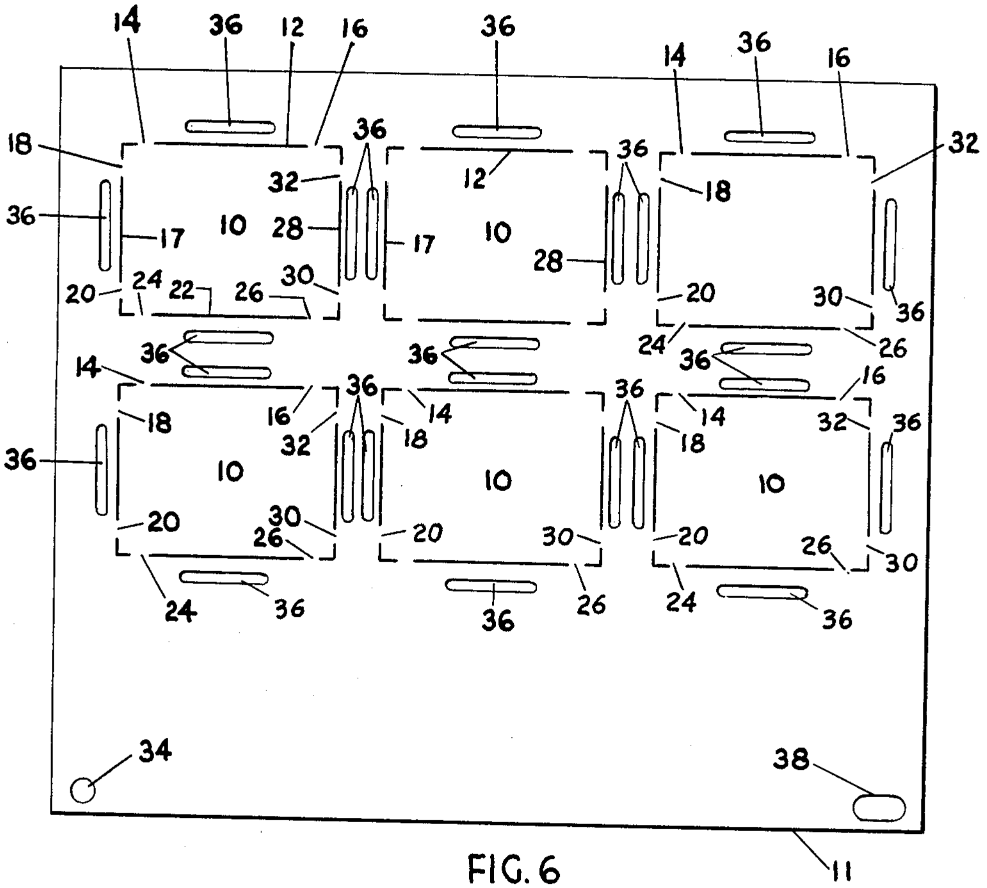
FIGURE 6 is a modified form of the improved masking material.

If the pins 42 and 44 are employed to register the negatives with the mask image area then it is possible to omit the grid 10. As shown in FIGURE 6 several die-cut windows and lay-out grids may be placed on one large mask with one common set of base holes controlling register onto press.

It is to be understood that the hole 38 may be oblong. The use of an oblong hole 38 is to adapt the mask to dimensional change which may result from temperature and/or moisture.

In the modified form shown in FIGURE 6 it would be possible to prepunch the film and then expose in camera which places image in proper relationship.

It is to be understood that film may be prepunched and then exposed in a suitable camera. This places the image in proper relationship to holes in the film. If this procedure is employed it is possible to build an assembly device in which there is a series of pins representing a number of images; for example 8½ x 11 in a given position for a standard size sheet of paper. The operator places the holes on prepunched film over two pins and this is done for as many negatives as are needed for the sheet and then position a mask with a corresponding number of die-cut windows and grids over the negatives and tape. It is to be understood that in this method the grid 10 may be eliminated.

Throughout the specifications and claims die-cut is intended to cover any means by which the masking material is treated to permit easy removal of the window portion; for example by die-cutting, providing openings, perforated portions, etc.

What is claimed:

1. A mask for use in stripping and plate making comprising a sheet of plastic material, said sheet consisting of a quickly removable grid portion and a perimeter portion, the said quickly removable grid portion attached to the perimeter portion at predetermined areas only adjacent to the corners with die-cuts extending between the said predetermined attached corner areas, the said perimeter portion having openings therein adjacent to a die-cut line but spaced closer to edge of mask, pressure-sensitive adhesive tape secured to the perimeter and over the said openings for securing the said mask to a printing plate or the like, and said perimeter portion having openings for the reception of nibs for holding in position the said mask on a printing plate, film and the like.

2. A mask for use in stripping and plate making comprising a sheet of plastic material, a perimeter portion, a grid portion, said grid portion quickly removable from the perimeter portion, the said grid portion connected to the perimeter portion at predetermined spaced apart points adjacent only to the corners of the grid portion, die-cuts extending along the sides between the portions connecting the perimeter and the grid portion, and die-cuts at the corners between the said connecting portions, said perimeter portion having elongated openings adjacent to the die-cuts and spaced between the die-cut and the edge of the mask, pressure-sensitive adhesive tape attached to the perimeter portion and over the elongated openings for securing mask to a print plate or the like, and the perimeter portion having openings for the reception of nibs in positioning the mask to a printing plate, film and the like.

3. A mask for use in stripping and platemaking comprising a substantially rectangular sheet, said sheet having a printed substantially rectangular grid portion, a perimeter portion connected to the grid portion adjacent the corners thereof with die-cuts extending between the portions connecting the grid portion to the perimeter and die-cuts at the corners between the portion connecting the grid to the perimeter, said perimeter portion having openings therein between the die-cuts and the edge of the mask and on opposite sides of the grid portion, pressure-sensitive adhesive secured to the perimeter and extending over the openings therein for securing the said mask to a print plate, film and the like.

References Cited by the Examiner

UNITED STATES PATENTS

| | | | |
|---|---|---|---|
| 960,301 | 6/10 | Fitz | 95—79 |
| 1,061,727 | 5/13 | Carkhuff | 95—79 |
| 2,037,764 | 4/36 | Daneker | 95—79 |
| 2,534,961 | 12/50 | Dunn | 75—79 |
| 2,685,223 | 8/54 | Dufour | 352—47 |

JOHN M. HORAN, *Primary Examiner.*

NORTON ANSHER, *Examiner.*